US006847719B1

(12) United States Patent
Ballard

(10) Patent No.: US 6,847,719 B1
(45) Date of Patent: Jan. 25, 2005

(54) LIMITING RECEIVER ACCESS TO SECURE READ-ONLY COMMUNICATIONS OVER A NETWORK BY PREVENTING ACCESS TO SOURCE-FORMATTED PLAINTEXT

(75) Inventor: Clinton L. Ballard, Suquamish, WA (US)

(73) Assignee: eAcceleration Corp., Poulsbo, WA (US)

( * ) Notice: Subject to any disclaimer, the term of this patent is extended or adjusted under 35 U.S.C. 154(b) by 839 days.

(21) Appl. No.: 09/637,467

(22) Filed: Aug. 11, 2000

(51) Int. Cl.[7] .................................................. H04L 9/00
(52) U.S. Cl. .......................................... 380/279; 705/57
(58) Field of Search ................................. 713/200, 201; 380/277–280, 286, 201; 705/57, 51; 707/1, 9; 725/25, 31

(56) References Cited

U.S. PATENT DOCUMENTS

| | | | | | |
|---|---|---|---|---|---|
| 5,557,678 A | * | 9/1996 | Ganesan | ..................... | 380/282 |
| 5,604,801 A | * | 2/1997 | Dolan et al. | ................. | 713/159 |
| 5,673,385 A | * | 9/1997 | Mack et al. | ................... | 714/44 |
| 5,973,731 A | * | 10/1999 | Schwab | ....................... | 348/161 |
| 6,118,870 A | * | 9/2000 | Boyle et al. | ................. | 380/201 |
| 6,229,895 B1 | * | 5/2001 | Son et al. | ................... | 380/200 |
| 6,301,660 B1 | * | 10/2001 | Benson | ....................... | 713/165 |
| 6,625,734 B1 | * | 9/2003 | Marvit et al. | ............... | 713/201 |

\* cited by examiner

*Primary Examiner*—Andrew Caldwell
*Assistant Examiner*—Zachary Davis
(74) *Attorney, Agent, or Firm*—Steven P. Koda

(57) ABSTRACT

Receiver access to a secure communication is determined by the sender. The sender defines an access parameter, such as number of times a message can be decrypted, expiration time of message, or some contingent event that triggers expiration of a message. A send configuration module defines the encryption method, encryption key length, and the control parameter(s). A key management module serves to implement the send configuration parameters during a communication. Upon receiving a message the receiver module contacts the key management module to request a decryption key. The key management module returns the decryption key or a 'denied' message. Once the message is decrypted at the receiver, the key and the decrypted source are deleted from the receiver computer. The message is displayed in a bit-mapped window.

29 Claims, 3 Drawing Sheets

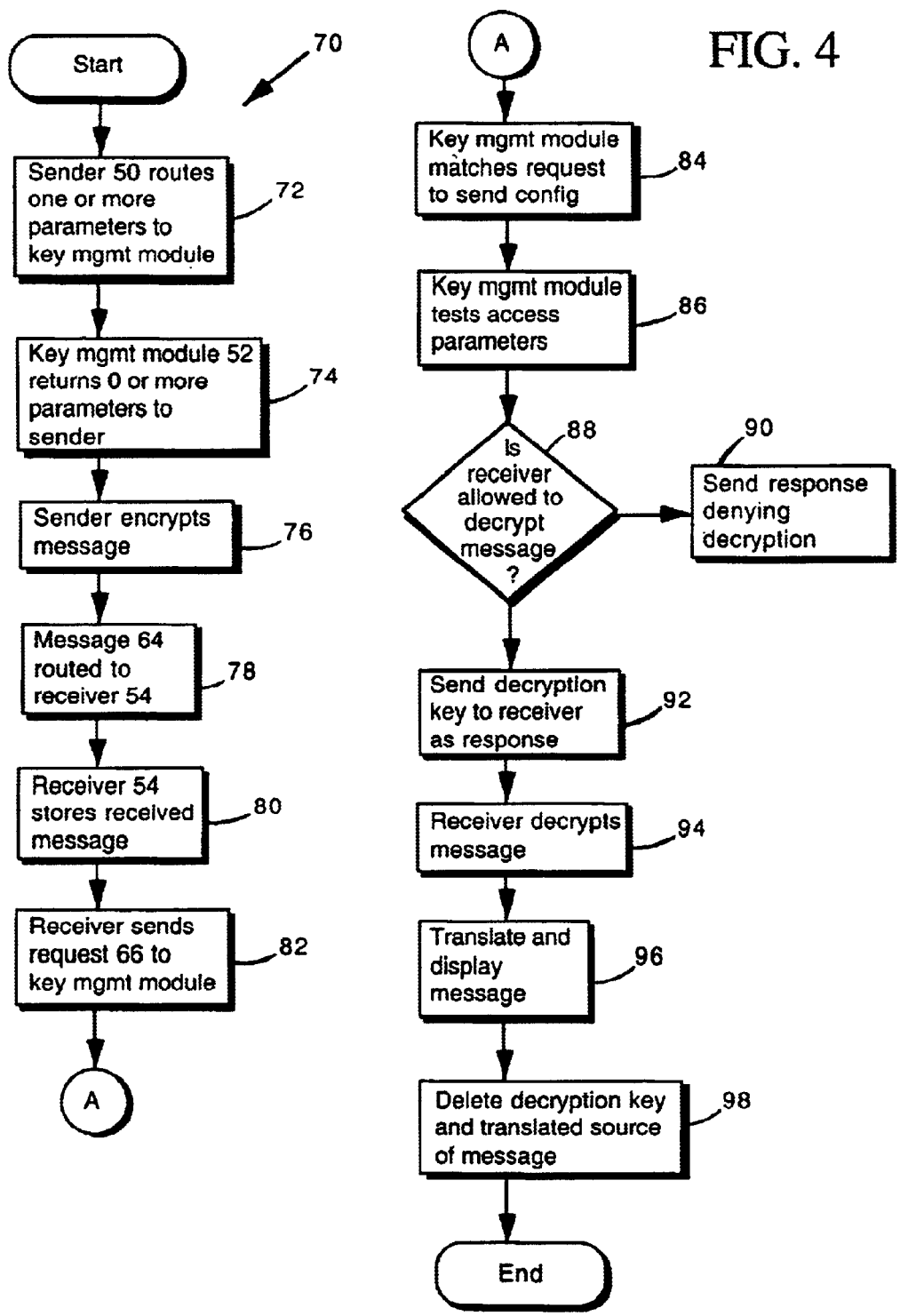

LIMITING RECEIVER ACCESS TO SECURE READ-ONLY COMMUNICATIONS OVER A NETWORK BY PREVENTING ACCESS TO SOURCE-FORMATTED PLAINTEXT

BACKGROUND OF THE INVENTION

This invention relates to methods and apparatus for securing communications over a network, and more particularly to a method and apparatus for limiting receiver access to the communication.

With the increased use of computer networks to carry communications there is an increasing need for securing communications. For example, it is well known for a sender to encrypt an e-mail communication, which the receiver then decrypts. It also is known to provide a secure communication channel in which server computers encrypt all data along the channel regardless of the efforts of the sender to encrypt or not encrypt the communication.

In these known secured communication methods the end user receives either an encrypted or unencrypted message. If encrypted, the user has some manner of decrypting the communication. For example, the user typically has possession of a decryption key. Once the message is received the user stores and accesses the encrypted, unencrypted and/or decrypted message at their desire. These known methods assume that either the receiver is trustworthy, or that the receiver is the one who would be harmed by free disclosure of the information (rather than the sender or some other party). For example, in public key cryptography the receiver can decrypt the message as many times as desired and store the message in an unencrypted form. Thus, the receiver gets control of the received information. As the applications for network communications grow, there are many types of transactions to be handled over a network. In some it may be preferable not to assume the receiver will maintain the security of confidential information. Accordingly, there is a need to provide security which limits the receiver's access to received communications.

SUMMARY OF THE INVENTION

According to the invention, receiver access to a secure communication is determined by the sender. The sender defines an access parameter, such as a number of times a message can be decrypted, an expiration time/date of message access, and/or a contingent event that triggers expiration of the message access.

According to a preferred embodiment, there is a send configuration module, a key management module, and a receiver module for controlling the security of a message. The send configuration module defines the encryption method, encryption key length, and the control parameter(s). The key management module serves to implement the send configuration parameters during a communication. The receiver module receives and, when permitted, decrypts the message. In an alternative embodiment the sender creates the key and registers the key with the key management module.

According to an aspect of the invention, the receiver module receives and stores an encrypted message. The receiver module then contacts the key management module and requests a decryption key. The key management module returns the decryption key or a message indicating a denial to send the decryption key. Upon being requested for the decryption key, the key management module tests the control parameter(s) specified by the send configuration module to determine whether a decryption is to be permitted. If permitted, then the decryption key is sent. Otherwise, the 'denied' message is sent.

According to another aspect of the invention, once the message is decrypted by the receiver module, the message is displayed in a bit-mapped window. Specifically, the message is decrypted into a source format. The source format then is converted to a bit-mapped display format. The decryption key and the source material are immediately deleted. Thus, the receiver does not retain possession of the decryption key or of a source format of the message. Only pixel information is present in the remaining bit-mapped display format. The message now is not amenable to easy translation back into a source format. The use of a bit-mapped format serves as a deterrent to copying, storing, manipulating or forwarding the decrypted message. In some embodiments the receiver module prevents the bit-mapped display image of the message from being printed or copied.

One advantage of the invention is that confidential information can be sent to a receiver with the sender maintaining some control over the receiver's access to the information. For example, the sender can limit the receiver to one view of the information, or to a limited number of views. The sender can additionally or alternatively limit the viewing to a specific time period. The sender additionally or alternatively can limit the viewing to the presence or absence of a specific contingency.

These and other aspects and advantages of the invention will be better understood by reference to the following detailed description taken in conjunction with the accompanying drawings.

BRIEF DESCRIPTION OF THE DRAWINGS

FIG. 4 is a flow chart of a method for securing receiver access to messages according to an embodiment of this invention.

DESCRIPTION OF SPECIFIC EMBODIMENTS

Host Network Environment

Figure 1:
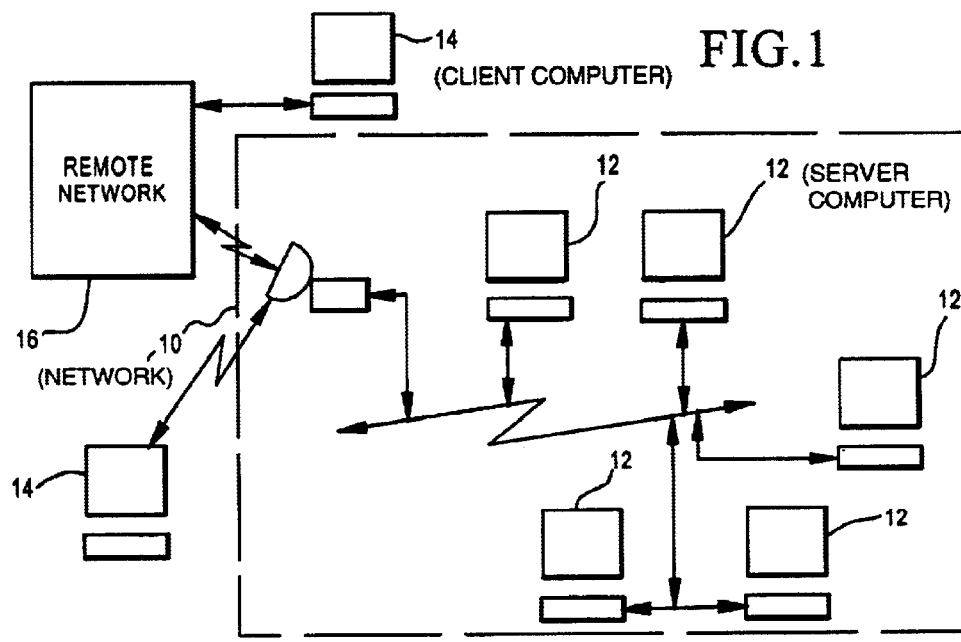
FIG. 1 is a schematic diagram of an exemplary client-server network hosting the method of this invention.

FIG. 1 shows a wide area network 10 formed by a plurality of network server computers 12 which are interlinked. Each network server computer 12 stores documents accessible to other network server computers 12 and to client computers 14 and networks 16 which link into the wide area network 10. The configuration of the wide area network 10 may change over time as client computers 14 and one or more networks 16 connect and disconnect from the network 10. For example, when a client computer 14 and a network 16 are connected with the network servers computers 12, the wide area network includes such client computer 14 and network 16. As used herein the term computer includes any device or machine capable of accepting data, applying prescribed processes to the data, and supplying results of the processes.

The wide area network 10 stores information which is accessible to the network server computers 12, remote networks 16 and client computers 14. The information is accessible as documents. The term document as used herein, includes files (as per the Windows operating system usage), documents (as per the MacOS operating system usage), pages (as per the web phraseology usage), and other records, entries or terminology used to describe a unit of a data base, a unit of a file system or a unit of another data collection type, whether or not such units are related or relational.

The network server computers 12 are formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into the wide area network 10 using a modem and the standard telephone communication network. Alternative carrier systems such as cable and satellite communication systems also may be used to link into the wide area network 10. Still other private or time-shared carrier systems may be used. In one embodiment the wide area network is a global information network, such as the internet. In another embodiment the wide area network is a private intranet using similar protocols as the internet, but with added security measures and restricted access controls. In still other embodiments the wide area network is a private, or semi-private network using proprietary communication protocols.

The client computer 14 is any end user computer, and may also be a mainframe computer, minicomputer or microcomputer having one or more microprocessors. The remote network 16 may be a local area network, a network added into the wide area network through an independent service provider (ISP) for the internet, or another group of computers interconnected by wired or wireless transfer media having a configuration which is either fixed or changing over time. Client computers 14 may link into and access the wide area network 10 independently or through a remote network 16.

Computer System

Figure 2:
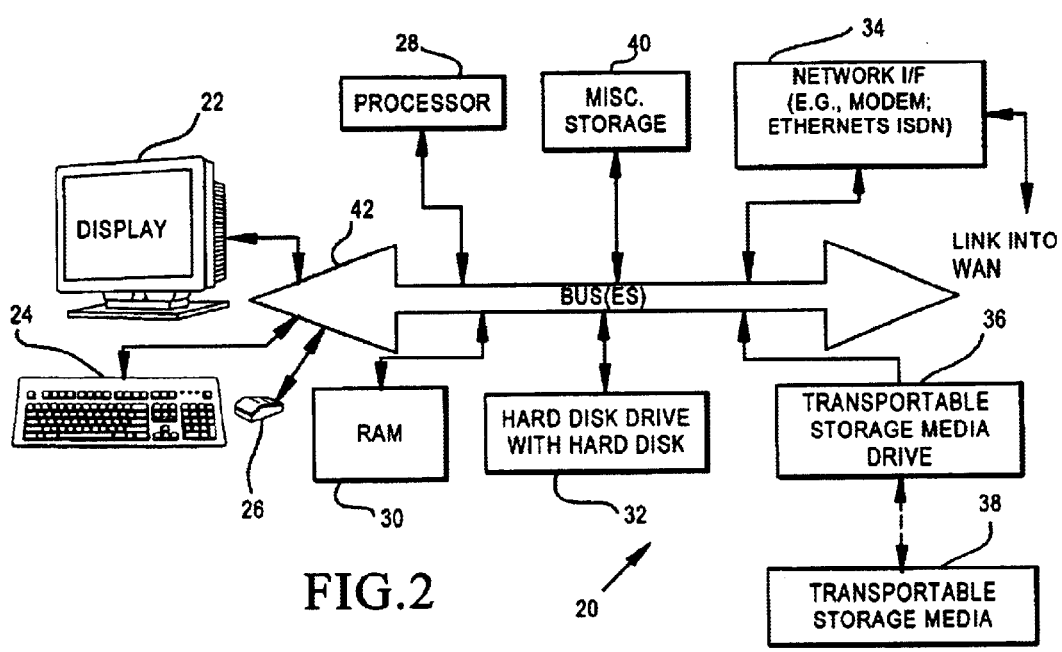
FIG. 2 is a block diagram of a computer system for a computer connected into the client-server network of FIG. 1.

The functions of the present invention preferably are performed by programmed digital computers of the type which are well known in the art, an example of which is shown in FIG. 2. A computer system 20 has a display monitor 22, a keyboard 24, a pointing/clicking device 26, a processor 28, random access memory (RAM) 30, a non-volatile storage device such as a hard disk drive 32, a communication or network interface 34 (e.g., modem; ethernet adapter), and a transportable storage media drive 36 which reads transportable storage media 38. In addition other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the keyboard 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device.

Method for Securing Communication

Figure 3:
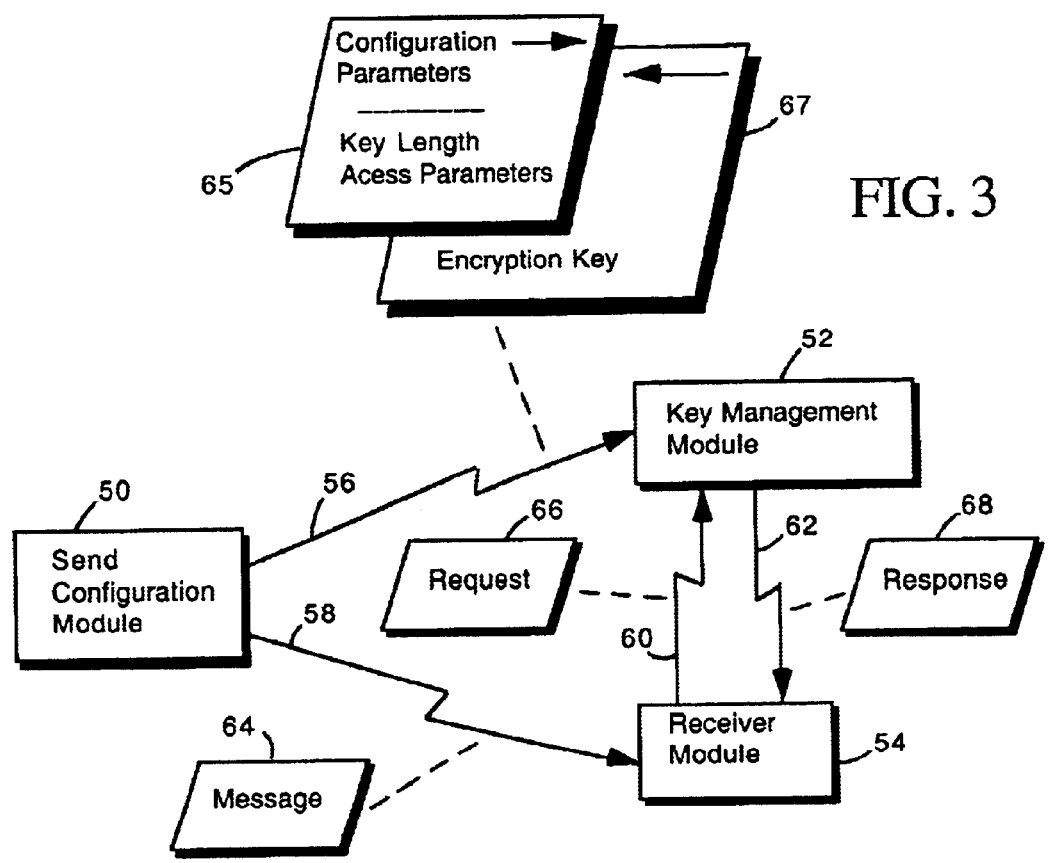
FIG. 3 is a block diagram of communications between functional modules according to an embodiment of this invention.

Referring to FIG. 3, the computer network 10 is functionally configured to host a send configuration software module 50, a key management software module 52 and a receiver software module 54 according to an embodiment of this invention. The send configuration module 50 is hosted by a computer 20, such as a client computer 14 or a server computer 12. The receiver module 54 is hosted by a different computer 20, such as another client computer 14 or server computer 12. Also, the key management module 52 is hosted by a computer 20, such as a client computer 14 or a server computer 12. In some embodiments any one or more of these computers are part of the remote network 16.

The communication paths 56, 58, 60, 62 between the send configuration module 50, key management module 52 and receiver module 54 are implemented by the wide area network 10 and/or remote network 16. In an alternative embodiment the key management module and the send configuration module are hosted by a common computer. In such embodiment the communication 56 between the send configuration module and the key management module is a local data operation within the common computer. The communications 56, 58, 60 and 62 are performed either on a secured communication channel or an unsecured communication channel. In addition, the send configuration module sends an encrypted message 64 to the receiver module 54.

Referring to FIG. 4, a flow chart 70 of the communication process includes several steps. When a user decides to send a message to a receiver, the sender determines the encryption method to be used, the key length for the encryption/decryption and the access parameters. Any known or proprietary encryption methods are used in varying embodiments. In a preferred embodiment a key-based encryption method is used. The key is maintained, however, by the key management module 52. The sender determines the degree or sophistication of the encryption by specifying a key length. Alternatively, the sender module creates the key then registers the key with the key management module. The sender also specifies the receiver's access privileges. Specifically, the sender defines one or access parameters, such as an expiration date/time, a maximum number of times the message is permitted to be decrypted, a time period during which the message can be decrypted, or some contingency which is to occur or not occur for the decryption to be permitted.

At step 72, the send configuration module 50 sends one or more configuration parameter(s) 65 along communication 56 to the key management module 52. One parameter is a key parameter. In one embodiment the key parameter defines a key length. The key management module generates a key having a length equal to the key length parameter value and returns the key to the sender for the sender to encrypt the message 64. In another embodiment the sender generates the key and sends it to the key management module as the key parameter. The key received or generated by the key management module is the decryption key for decrypting the secured message 64.

In some embodiments, the sender sends a message identification code to the key management module as one of the configuration parameters. In another embodiment the key management module instead generates the message identification code and returns it to the send configuration module as a configuration parameter.

In various embodiments additional parameters may include one or more access parameters. In some embodiments one or more access parameters are transmitted by the sender to the key management module. The one or more access parameters are used by the key management module to determine whether the receiver is permitted to decrypt the message. In other embodiments the key management module instead uses a default access parameter(s), so that the access parameter(s) need not be transmitted by the sender or the key management module as part of the configuration parameters.

The key management module 52 receives the configuration parameter(s) and initializes a key management operation for a sender-receiver communication 58. For the embodiment where a key length parameter is received, at step 74, the key management module 52 derives an encryption key and returns the values 67 to the send configuration module 50 along the communication path 56. Where the configuration parameter includes the key, the key is registered with the key management module by being stored.

Where the configuration parameters include a message identification code, such code is associated with the generated or registered key. Where the configuration parameters do not include the message identification code, the code is generated by the key management module. The code is associated with the generated or registered key, and also transmitted to the send configuration module (at step 74).

Where the configuration parameters include one or more access parameters, the access parameters are stored for processing reviver requests for a decryption key. Such access parameters are associated with the corresponding message identification code, (e.g., as generated by the sender configuration module or the key management module).

The send configuration module having the encryption key and the message identification code, (each one being returned from the key management module or generated by send configuration module), at step 76 encrypts a desired message using the encryption key. At step 78 the sender transmits the encrypted message and the message identification code to the receiver along communication path 58 as the message 64.

The receiver receives and stores the message 64 at step 80. The receiver does not have the decryption key for decrypting the message. When the user decides to view the message, the receiver module 54 is invoked to send a request 66 at step 82 to the key management module for the decryption key. Included with the request is the message identification code. The key management module 52 uses the message identification code to identify the access parameters and decryption key corresponding to such message code at step 84. The key management module 52 in some embodiments is at a default address on the network 10. In another embodiment the key management module address is specified in the message 64, with the message code and the encrypted message.

At step 86 the key management module 52 tests the access parameters (e.g., either default values or parameters registered by the send configuration module for the corresponding message identification code). When the access parameter is an expiration date and time, the current date time as defined by the computer hosting the key management module 52 is compared to the expiration date and time. When the access parameter defines a number of times the message is permitted to be decrypted, the key management module 52 tests a count which it maintains of the number of times a decryption key for the corresponding message has been given out. When the access parameter is a time period, the current time is compared to the time period. When the access parameter is for some other contingency, the contingency is evaluated. Examples of contingencies include but are not limited to: non-payment of funds, non receipt of subsequent messages. In another exemplary embodiment a contingency parameter is used to implement a subscription mechanism such as for the sale or license of data. The key management module 52 implements the access parameters and promptly destroys decryption keys for messages that have expired or are otherwise no longer permitted to be accessed by the receiver.

The testing at step 86 results in a decision at step 88 either allowing a decryption or disallowing a decryption. If a decryption is not allowed, then at step 90, the key management module 52 transmits a response 68 along communication path 62 to the receiver indicating that the decryption request has been denied. Accordingly, the decryption key is not sent to the receiver module 54. If a decryption is allowed at decision step 88, then at step 92 the decryption key is sent to the receiver along communication path 62 as the response 68.

If the decryption request 66 is denied, the receiver is unable to decrypt the message short of cracking the encryption algorithm. If the decryption request 66 is granted, then at step 94 the receiver module 54 uses the decryption key in the response 68 to decrypt the message 64. The result of the decryption is a source format of the decrypted message which is stored in a temporary RAM storage area. The received decryption key also is stored in temporary RAM storage. Exemplary source formats include ascii text, a word processor format, HTML, PDF, GIF, rich text format or some proprietary or standard text, non-text or combined text and non-text format. At step 96, the decrypted message now is translated into a display format permitting a user at the receiver computer to view the message. For example, a display format is commonly a bit-map of pixel values in RGB or another standard display format.

Note that the receiver computer has the decrypted source of the message and the decryption key, along with the display-formatted message. All are stored in a temporary RAM storage area. The display formatted message is not amenable to translation and typically is not retained long after the display buffers are erased (such as by displaying other information). To provide a meaningful restriction to the receiver's access, the decrypted source format of the message and the decryption key are deleted at step 98. In a preferred embodiment the deletion of the decryption key occurs immediately after decrypting the message 64. The deletion of the source format occurs immediately after translation into the display format. The bit-mapped display format is deleted or overwritten once displayed.

The brief time period in which the decryption key resides on the receiver computer is a recognized period of vulnerability where concern for sabotaging this security method is concerned. Accordingly, in some embodiments interrupts at the receiver computer are denied during the time period between receipt of the decryption key and deletion of the decryption key. In some embodiments the denial of interrupts lasts from receipt of the decryption key until deletion of both the decryption key and the source format of the decrypted message. This has the unfortunate side effect of locking up the machine during all of this time, but will provide a maximum level of security, because there is only a single moment of vulnerability between the time that the decryption key is received and interrupts are disabled.

In another embodiment, additional methods are implemented to resist sabotage of this method. To minimize the possibility of intercepting the decryption key layers of encryption are implemented, where the specific algorithm and key length, message id, etc. are wrapped inside another message. Now multiple sets of keys would have to compromised. Thus, the chance of interception are reduced.

Meritorious and Advantageous Effects

One advantage of the invention is that confidential information can be sent to a receiver with the sender maintaining some control over the receiver's access to the information. For example, the sender can limit the receiver to one view of the information, or to a limited number of views. The sender can additionally or alternatively limit the viewing to a specific time period. The sender additionally or alternatively can limit the viewing to the presence or absence of a specific contingency.

Although a preferred embodiment of the invention has been illustrated and described, various alternatives, modifications and equivalents may be used. For example, in various embodiments the decryption key is or is not the same key as the encryption key. Also, in various embodiments the decryption key is or is not available to the sender. Therefore, the foregoing description should not be taken as limiting the scope of the inventions which are defined by the appended claims.

What is claimed is:

1. A method for communicating between a sender and a receiver over a computer network, comprising the steps of:

defining a plurality of parameters for a secure message, at least one of the plurality of parameters accessible to a management module for controlling receiver access to a decryption key;

sending the secure message from the sender to the receiver over a network;

receiving the secure message at the receiver;

sending a request from the receiver to a management module for the decryption key;

processing the request at the management module to determine whether the receiver is permitted to decrypt the message based on said at least one of the plurality of parameters;

when not permitted, sending a denial message to the receiver;

when permitted, sending the decryption key to the receiver; and when the decryption key is sent to the receiver, decrypting the message at the receiver into a source format, reformatting the decrypted message into a prescribed format, deleting the decryption key and preventing access to the decrypted message in the source format after said reformatting by deleting the source-formatted decrypted message.

2. The method of claim 1, wherein the step of defining comprises the steps of:

sending a key length parameter from the sender to the management module;

deriving at the management module a key having a length corresponding to the key length parameter; and defining a message code parameter to correspond to and be sent with the secure message; and wherein the step of sending a request comprises sending a request including the message code to the management module.

3. The method of claim 1, wherein the step of defining comprises the steps of:

sending a key parameter from the sender to the management module;

storing the key parameter at the management module as the decryption key;

defining a message code parameter to correspond to and be sent with the secure message, the message code being stored at the sender and at the management module; and wherein the step of sending a request comprises sending a request including the message code from the receiver to the management module.

4. The method of claim 1, wherein the step of defining comprises the steps of defining a message identification code and defining an access parameter used for determining receiver access to the decryption key of the secure message which corresponds to the message code, said access parameter being accessible to the management module, wherein the step of sending a request comprises sending the message code from the receiver to the management module, and wherein the step of processing the request comprises testing the access parameter corresponding to the message code to determine whether the receiver is permitted to decrypt the message.

5. The method of claim 4, wherein the access parameter is defined by the sender and is received at the management module from the sender.

6. The method of claim 4, wherein the message code is received at the management module from the sender.

7. The method of claim 4, wherein the access parameter is a default value known to the management module.

8. The method of claim 4, wherein the message code is defined by the management module and transmitted to the sender for inclusion with the secure message.

9. A method for communicating between a sender and a receiver over a computer network, comprising the steps of:

defining a plurality of parameters for a secure message, at least one of the plurality of parameters accessible to a management module for controlling receiver access to a decryption key;

sending the secure message from the sender to the receiver over a network;

receiving the secure message at the receiver;

sending a request from the receiver to a management module for the decryption key;

processing the request at the management module to determine whether the receiver is permitted to decrypt the message based on said at least one of the plurality of parameters;

when not permitted, sending a denial message to the receiver;

when permitted, sending the decryption key to the receiver; and when the decryption key is sent to the receiver, decrypting the message at the receiver into a source format, reformatting the decrypted message into a prescribed format, deleting the decryption key and the source-formatted decrypted message;

in which the step of processing the request at the management module to determine whether the receiver is permitted to view the message comprises: maintaining a count of a number of times that the decryption key has been sent to the receiver, testing said at least one of the plurality of parameters accessible to the management module to determine whether the count exceeds a maximum number of times to send the decryption key to the receiver, and denying permission to decrypt the message when the count exceeds the maximum number.

10. The method of claim 1, wherein the source-formatted decrypted message is deleted after said reformatting without having been stored in permanent memory, wherein the prescribed format is a display format, and wherein the display formatted message is not retained after being displayed.

11. The method of claim 1, in which the step of processing the request at the management module to determine whether the receiver is permitted to view the message comprises:

monitoring a contingent event specified in said at least one of the plurality of parameters accessible to the management module; and testing the contingent event to determine whether the decryption of the secure message by the receiver is permissible.

12. The method of claim 1, wherein the prescribed format is a bit-mapped display format.

13. A method for communicating between a sender and a receiver over a computer network, comprising the steps of:

defining a plurality of parameters for a secure message, at least one of the plurality of parameters accessible to a management module for controlling receiver access to a decryption key;

sending the secure message from the sender to the receiver over a network;

receiving the secure message at the receiver;

sending a request from the receiver to a management module for the decryption key;

processing the request at the management module to determine whether the receiver is permitted to decrypt the message based on said at least one of the plurality of parameters;

when not permitted, sending a denial message to the receiver;

when permitted, sending the decryption key to the receiver; and when the decryption key is sent to the receiver, decrypting the message at the receiver into a source format, reformatting the decrypted message into a prescribed format, deleting the decryption key and the source-formatted decrypted message;

wherein during the steps of decrypting the message at the receiver into a source format, reformatting the decrypted message into a prescribed format, and deleting the decryption key and the source-formatted decrypted message, interrupts are disabled at the receiver to prevent unauthorized access to the source-formatted decrypted message.

14. A method for communicating between a sender and a receiver over a computer network, comprising the steps of:

setting a send configuration parameter for a secure message;

routing the send configuration parameter to a management module;

sending the secure message from the sender to the receiver over a network;

receiving the secure message at the receiver;

sending a request from the receiver to the management module for a decryption key;

processing the request at the management module to determine whether the receiver is permitted to decrypt the message;

when not permitted, sending a denial message to the receiver;

when permitted, sending the decryption key to the receiver; and when the decryption key is sent to the receiver, decrypting the message at the receiver into a source format, reformatting the decrypted message into a prescribed format, and deleting the decryption key and the source-formatted decrypted message without first storing the decryption key and source-formatted decrypted message in a permanent memory.

15. A system for securing communication between a sender and a receiver over a computer network, comprising:

a plurality of parameters pertaining to a secure message;

a management module which stores the plurality of parameters;

a communication pathway for carrying the secure message from the sender to the receiver over the network;

a communication pathway along which the receiver sends a request to the management module for a decryption key;

wherein the management module comprises means for processing the request to determine whether the receiver is permitted to decrypt the message, said processing means comprising means for testing at least one of said plurality of parameters;

means for sending a denial message to the receiver when the management module determines that decryption is not permitted;

means for sending the decryption key to the receiver when the management module determines that decryption is permitted;

processing means at the receiver for decrypting the message at the receiver into a source format, reformatting the decrypted message into a prescribed format, and deleting the decryption key and the source-formatted decrypted message without first storing the decryption key and source-formatted decrypted message in a permanent memory.

16. The system of claim 15, wherein the plurality of parameters comprises: a maximum number of times that the secure message, is permitted to be decrypted.

17. The system of claim 15, wherein the plurality of parameters comprises: an expiration time after which the secure message is not permitted to be decrypted.

18. The system of claim 15, wherein the plurality of parameters comprises: a parameter for determining a permissible time period during which the secure message is permitted to be decrypted.

19. The system of claim 15, wherein the plurality of parameters comprises: a parameter which specifies a contingent event, wherein one of either the occurrence or nonoccurrence of said contingent event is testable to determine whether the secure message is permitted to be decrypted.

20. The system of claim 15, wherein the management module resides with the sender.

21. The system of claim 15, wherein the prescribed format is a bit-mapped display format.

22. The system of claim 15, comprising means for disabling interrupts at the receiver to prevent unauthorized access to the source-formatted decrypted message, while the processing means decrypts the message into the source format, reformats the decrypted message into the prescribed format, and deletes the decryption key and the source-formatted decrypted message.

23. The system of claim 15, wherein the management module resides at a server computer in the network.

24. The system of claim 23, wherein the plurality of parameters comprises:

a message code, an encryption key and an access parameter, and wherein the sender defines the message code and sends the message code to the management module.

25. The system of claim 23, wherein the plurality of parameters comprises:

a message code, an encryption key and an access parameter, and wherein the sender defines the encryption key and sends the encryption key to the management module, the decryption key corresponding to the encryption key.

26. The system of claim 23, wherein the plurality of parameters comprises:

a message code, an encryption key and an access parameter, and wherein the sender defines the access parameter and sends the access parameter to the management module.

27. The system of claim 23, wherein the plurality of parameters comprises:

a message code, an encryption key and an access parameter, and wherein the management module defines the message code and sends the message code to the sender for inclusion with the secure message.

28. The system of claim 23, wherein the plurality of parameters comprises:

a message code, an encryption key and an access parameter, and wherein the management module defines the encryption key and sends the encryption key to the sender, the decryption key corresponding to the encryption key.

29. The system of claim 23, wherein the plurality of parameters comprises:

a message code, an encryption key and an access parameter, and wherein the access parameter is a default value known to the management module for use in processing the request.

* * * * *